(12) United States Patent
Zimmerman et al.

(10) Patent No.: US 10,810,759 B2
(45) Date of Patent: Oct. 20, 2020

(54) CREATING A THREE-DIMENSIONAL MODEL FROM A SEQUENCE OF IMAGES

(71) Applicants: International Business Machines Corporation, Armonk, NY (US); The Regents of the University of California, Oakland, CA (US)

(72) Inventors: Thomas G. Zimmerman, Cupertino, CA (US); Simone Bianco, San Jose, CA (US); Rebecca M. McGillivary, San Francisco, CA (US); Wallace F. Marshall, San Francisco, CA (US)

(73) Assignees: International Business Machines Corporation, Armonk, NY (US); The Regents of the University of California, Oakland ( * ) Notice: Subject to any disclaimer, the term of this patent is extended or adjusted under 35 U.S.C. 154(b) by 147 days.

(21) Appl. No.: 16/196,087

(22) Filed: Nov. 20, 2018

(65) Prior Publication Data

US 2020/0160554 A1 May 21, 2020

(51) Int. Cl.
*G06T 17/00* (2006.01)
*G06T 7/73* (2017.01)
(Continued)

(52) U.S. Cl.
CPC .............. *G06T 7/73* (2017.01); *G06T 3/0068* (2013.01); *G06T 7/11* (2017.01); *G06T 17/00* (2013.01);
(Continued)

(58) Field of Classification Search
CPC . G06T 7/73; G06T 7/11; G06T 3/0068; G06T 17/00–30; G06T 2200/08;
(Continued)

(56) References Cited

U.S. PATENT DOCUMENTS 6,466,205 B2 10/2002 Simpson et al.
6,909,816 B2 6/2005 Kychakoff et al.
(Continued)

FOREIGN PATENT DOCUMENTS

GB 2365243 B 3/2004

OTHER PUBLICATIONS

Shah et al., "Extracting 3-D Structure and Focused Images Using an Optical Microscope," Proceedings Fifth Annual IEEE Symposium on Computer-Based Medical Systems, 1992, pp. 292-301.
(Continued)

*Primary Examiner* — Sean T Motsinger
(74) *Attorney, Agent, or Firm* — Zilka-Kotab, P.C.

(57) ABSTRACT

A computer-implemented method according to one embodiment includes identifying a plurality of two-dimensional (2D) images illustrating a subject performing a rotation, selecting a representative image of the subject, cropping the plurality of 2D images, utilizing the representative image of the subject, to create a cropped plurality of 2D images, aligning each of the cropped plurality of 2D images, thereby creating an aligned plurality of 2D images, selecting a subset of the aligned plurality of 2D images that illustrate a predetermined amount of rotation of the subject, and creating a three-dimensional (3D) point cloud of the subject, utilizing the subset of the aligned plurality of 2D images.

21 Claims, 5 Drawing Sheets

(51) Int. Cl.
*G06T 7/11* (2017.01)
*G06T 3/00* (2006.01)

(52) U.S. Cl.
CPC .............. *G06T 2200/08* (2013.01); *G06T 2207/20048* (2013.01); *G06T 2207/20132* (2013.01); *G06T 2207/30204* (2013.01); *G06T 2210/56* (2013.01)

(58) Field of Classification Search
CPC . G06T 2207/20048; G06T 2207/20132; G06T 2207/30204; G06T 2210/56
See application file for complete search history.

(56) References Cited

U.S. PATENT DOCUMENTS

| | | | |
|---|---|---|---|
| 7,084,868 B2 | 8/2006 | Farag et al. | |
| 8,436,853 B1* | 5/2013 | Hickman | G06T 17/00 345/419 |
| 8,699,787 B2 | 4/2014 | van den Hengel et al. | |
| 10,284,794 B1* | 5/2019 | Francois | H04N 5/3415 |
| 2003/0071194 A1* | 4/2003 | Mueller | H04N 13/221 250/208.1 |
| 2003/0231175 A1* | 12/2003 | Pfister | G06T 15/205 345/419 |
| 2015/0163402 A1* | 6/2015 | Frueh | G06T 7/246 348/37 |
| 2016/0071318 A1* | 3/2016 | Lee | G06K 9/4609 345/419 |
| 2016/0247017 A1* | 8/2016 | Sareen | G06K 9/00369 |
| 2017/0018088 A1* | 1/2017 | Jeong | G06T 15/205 |
| 2017/0103510 A1* | 4/2017 | Wang | G06T 7/38 |
| 2017/0109888 A1* | 4/2017 | de Lima | H04N 13/257 |
| 2017/0304732 A1* | 10/2017 | Velic | A63F 13/65 |
| 2018/0165821 A1* | 6/2018 | Nezamabadi | H04N 13/271 |
| 2018/0202814 A1* | 7/2018 | Kudrynski | G06T 7/74 |
| 2019/0251733 A1* | 8/2019 | Festa | H04N 13/282 |
| 2019/0349562 A1* | 11/2019 | Oh | H04N 13/271 |
| 2019/0362546 A1* | 11/2019 | Wayenberg | G06T 17/20 |
| 2019/0371053 A1* | 12/2019 | Engholm | G01B 11/25 |
| 2020/0005448 A1* | 1/2020 | Subramanian | G06F 30/17 |
| 2020/0035022 A1* | 1/2020 | Huang | G01B 11/24 |

OTHER PUBLICATIONS

Chen et al., "New view generation from a video sequence," IEEE International Symposium on Circuits and Systems, 1998, pp. 81-84.
Dardano et al., "Three-dimensional imaging using digital holography and scanning electron microscopy," Fotonica AEIT Italian Conference on Photonics Technologies, 2014, 4 pages.
Zavala et al., "Three-dimensional Reconstruction of Objects Obtained by Two Orthogonal Cameras," IEEE Latin America Transactions, vol. 13, No. 9, Sep. 2015, pp. 3162-3168.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
Bucher, D., "A practical guide for fluorescent confocal microscopy," The Marder Lab, 2018, 7 pages, retrieved from https://blogs.brandeis.edu/marderlab/a-practical-guide-for-fluorescent-confocal-microscopy/.
Bouchard et al., "Swept confocally-aligned planar excitation (SCAPE) microscopy for high speed volumetric imaging of behaving organisms," Nat Photonics, Feb. 2015, 16 pages, retrieved from https://www.ncbi.nlm.nih.gov/pubmed/25663846.
Wikipedia, "CT scan," Wikipedia, 2018, 25 pages, retrieved from https://en.wikipedia.org/wiki/CT_scan.
Scikit-Image, "Module," scikit-image, 2018, 55 pages, retrieved from http://scikit-image.org/docs/dev/api/skimage.feature.html.
Wikipedia, "Blob detection," Wikipedia, 2018, 8 pages, retrieved from https://en.wikipedia.org/wiki/Blob_detection.
Toth, V., "Why does the ISS travel in a sine wave instead of a straight line over the surface of the Earth? Why is it always changing direction?" Quora, Feb. 2015, 5 pages, retrieved from https://www.quora.com/Why-does-the-ISS-travel-in-a-sine-wave-instead-of-a-straight-line-over-the-surface-of-the-Earth.
Scikit-Image, "Radon transform," scikit-image, 2018, 4 pages, retrieved from http://scikit-image.org/docs/dev/auto_examples/transform/plot_radon_transform.html.
Shaw et al., "Tilted view reconstruction in optical microscopy Three-dimensional reconstruction of *Drosophila melanogaster* embryo nuclei," Biophysical Journal, vol. 55, Jan. 1989, pp. 101-110.

* cited by examiner

CREATING A THREE-DIMENSIONAL MODEL FROM A SEQUENCE OF IMAGES

This invention was made with government support under DBI1548297 awarded by the National Science Foundation. The government has certain rights to this invention.

BACKGROUND

The present invention relates to image modelling, and more specifically, to creating a three-dimensional model from a sequence of images.

Three-dimensional models are often used for examining and analyzing a variety of different subjects. However, current modelling approaches are time-consuming, complicated and expensive, and often involve complex and bulky equipment that moves around a subject being examined. Current approaches may also require that a subject be immobilized during examination.

SUMMARY

A computer-implemented method according to one embodiment includes identifying a plurality of two-dimensional (2D) images illustrating a subject performing a rotation, selecting a representative image of the subject, cropping the plurality of 2D images, utilizing the representative image of the subject, to create a cropped plurality of 2D images, aligning each of the cropped plurality of 2D images, thereby creating an aligned plurality of 2D images, selecting a subset of the aligned plurality of 2D images that illustrate a predetermined amount of rotation of the subject, and creating a three-dimensional (3D) point cloud of the subject, utilizing the subset of the aligned plurality of 2D images.

According to another embodiment, a computer program product for creating a three-dimensional model from a sequence of images includes a computer readable storage medium that has program instructions embodied therewith, where the computer readable storage medium is not a transitory signal per se, and where the program instructions are executable by a processor to cause the processor to perform a method including identifying, by the processor, a plurality of two-dimensional (2D) images illustrating a subject performing a rotation, selecting, by the processor, a representative image of the subject, cropping, by the processor, the plurality of 2D images, utilizing the representative image of the subject, to create a cropped plurality of 2D images, aligning, by the processor, each of the cropped plurality of 2D images, thereby creating an aligned plurality of 2D images, selecting, by the processor, a subset of the aligned plurality of 2D images that illustrate a predetermined amount of rotation of the subject, and creating, by the processor, a three-dimensional (3D) point cloud of the subject, utilizing the subset of the aligned plurality of 2D images.

According to another embodiment, a system includes a processor, and logic integrated with the processor, executable by the processor, or integrated with and executable by the processor, where the logic is configured to identify a plurality of two-dimensional (2D) images illustrating a subject performing a rotation, select a representative image of the subject, crop the plurality of 2D images, utilizing the representative image of the subject, to create a cropped plurality of 2D images, align each of the cropped plurality of 2D images, thereby creating an aligned plurality of 2D images, select a subset of the aligned plurality of 2D images that illustrate a predetermined amount of rotation of the subject, and create a three-dimensional (3D) point cloud of the subject, utilizing the subset of the aligned plurality of 2D images.

Other aspects and embodiments of the present invention will become apparent from the following detailed description, which, when taken in conjunction with the drawings, illustrate by way of example the principles of the invention.

DETAILED DESCRIPTION

Figure 1:
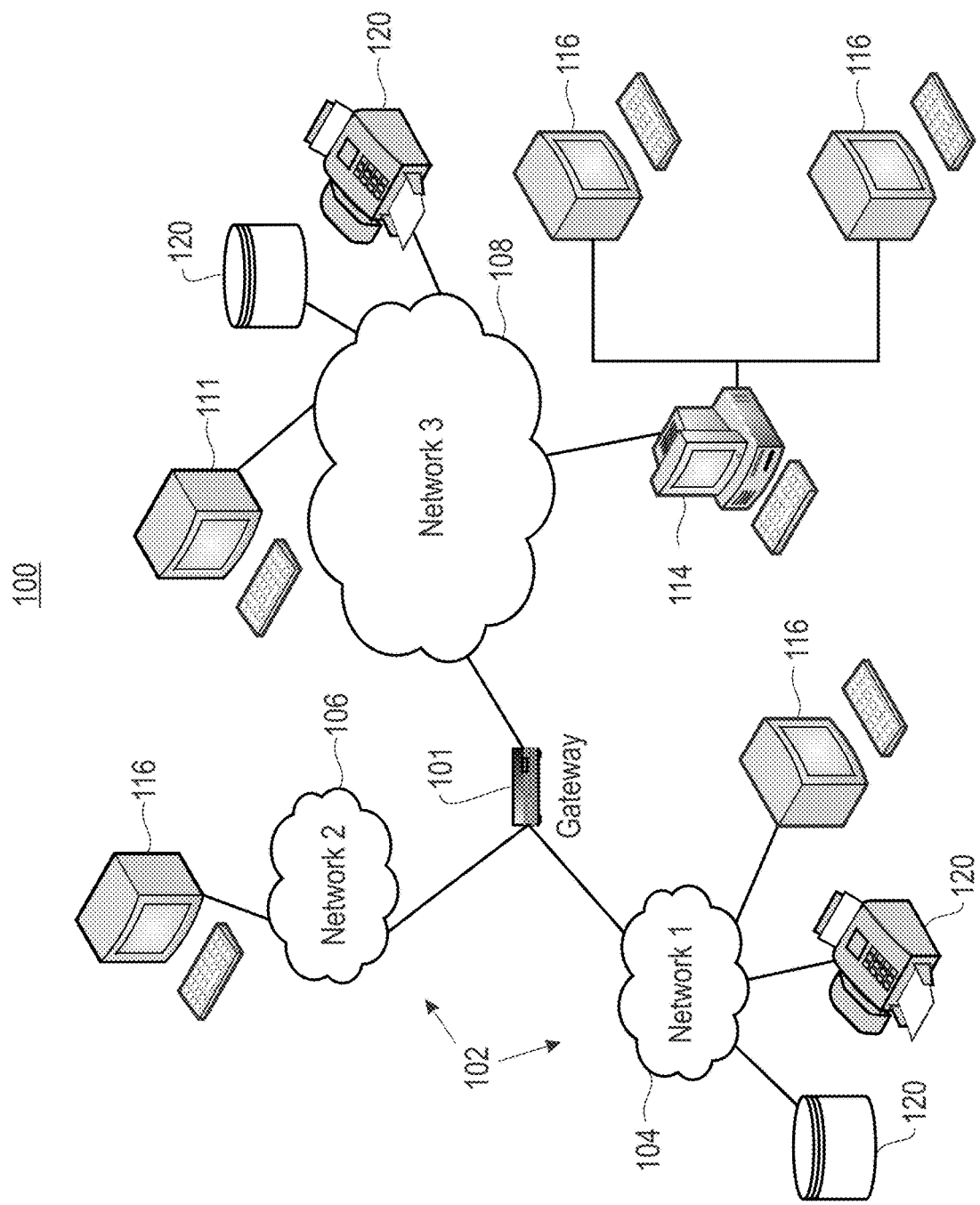
FIG. 1 illustrates a network architecture, in accordance with one embodiment.

The following description discloses several preferred embodiments of systems, methods and computer program products for creating a three-dimensional model from a sequence of images. Various embodiments provide a method for creating a subset of two-dimensional (2D) images that illustrate (i) a predetermined amount of rotation of a subject and (ii) the creation of a three-dimensional (3D) point cloud of the subject, by utilizing the subset of the aligned plurality of 2D images.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating a three-dimensional model from a sequence of images.

In one general embodiment, a computer-implemented method according to one embodiment includes identifying a plurality of two-dimensional (2D) images illustrating a subject performing a rotation, selecting a representative image of the subject, cropping the plurality of 2D images, utilizing the representative image of the subject, to create a cropped plurality of 2D images, aligning each of the cropped plurality of 2D images, thereby creating an aligned plurality of 2D images, selecting a subset of the aligned plurality of 2D images that illustrate a predetermined amount of rotation of the subject, and creating a three-dimensional (3D) point cloud of the subject, utilizing the subset of the aligned plurality of 2D images.

In another general embodiment, a computer program product for creating a three-dimensional model from a sequence of images includes a computer readable storage medium that has program instructions embodied therewith, where the computer readable storage medium is not a transitory signal per se, and where the program instructions are executable by a processor to cause the processor to perform a method including identifying, by the processor, a plurality of two-dimensional (2D) images illustrating a subject performing a rotation, selecting, by the processor, a representative image of the subject, cropping, by the processor, the plurality of 2D images, utilizing the representative image of the subject, to create a cropped plurality of 2D images, aligning, by the processor, each of the cropped plurality of 2D images, thereby creating an aligned plurality of 2D images, selecting, by the processor, a subset of the aligned plurality of 2D images that illustrate a predetermined amount of rotation of the subject, and creating, by the processor, a three-dimensional (3D) point cloud of the subject, utilizing the subset of the aligned plurality of 2D images.

In another general embodiment, a system includes a processor, and logic integrated with the processor, executable by the processor, or integrated with and executable by the processor, where the logic is configured to identify a plurality of two-dimensional (2D) images illustrating a subject performing a rotation, select a representative image of the subject, crop the plurality of 2D images, utilizing the representative image of the subject, to create a cropped plurality of 2D images, align each of the cropped plurality of 2D images, thereby creating an aligned plurality of 2D images, select a subset of the aligned plurality of 2D images that illustrate a predetermined amount of rotation of the subject, and create a three-dimensional (3D) point cloud of the subject, utilizing the subset of the aligned plurality of 2D images.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
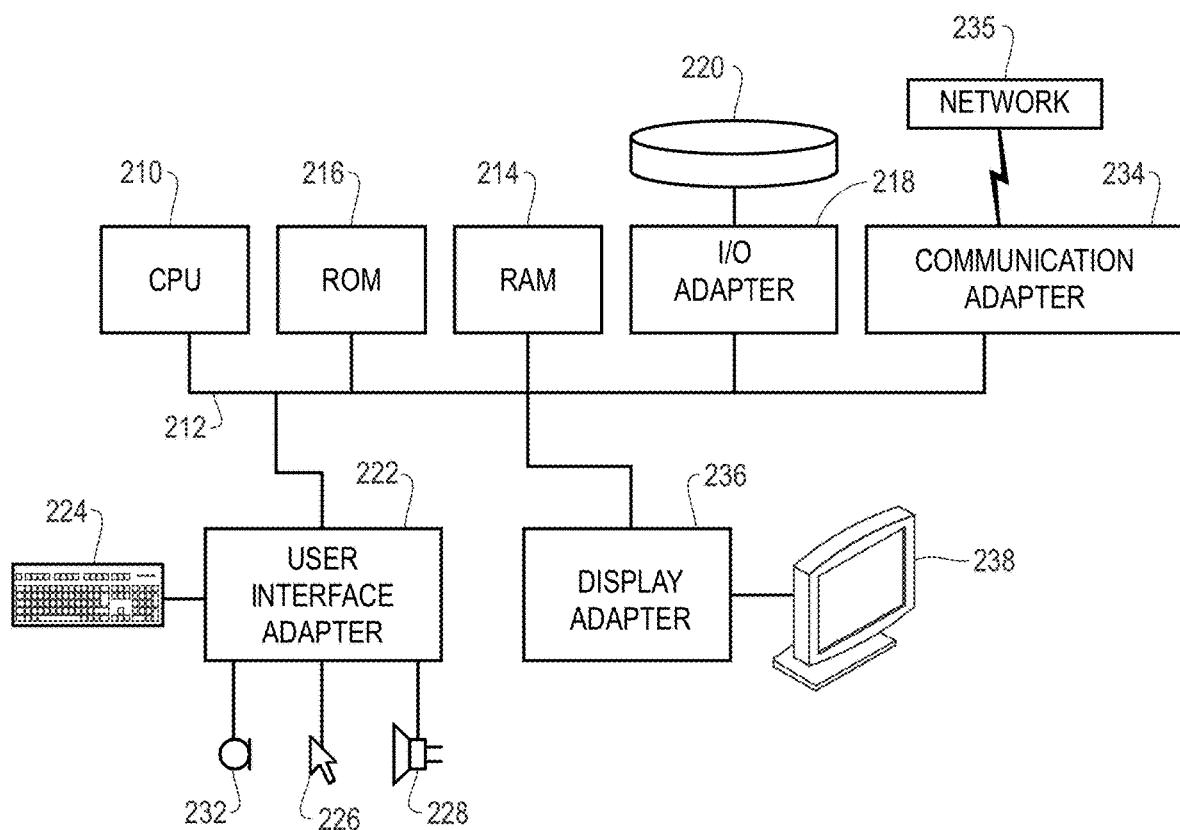
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network), and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
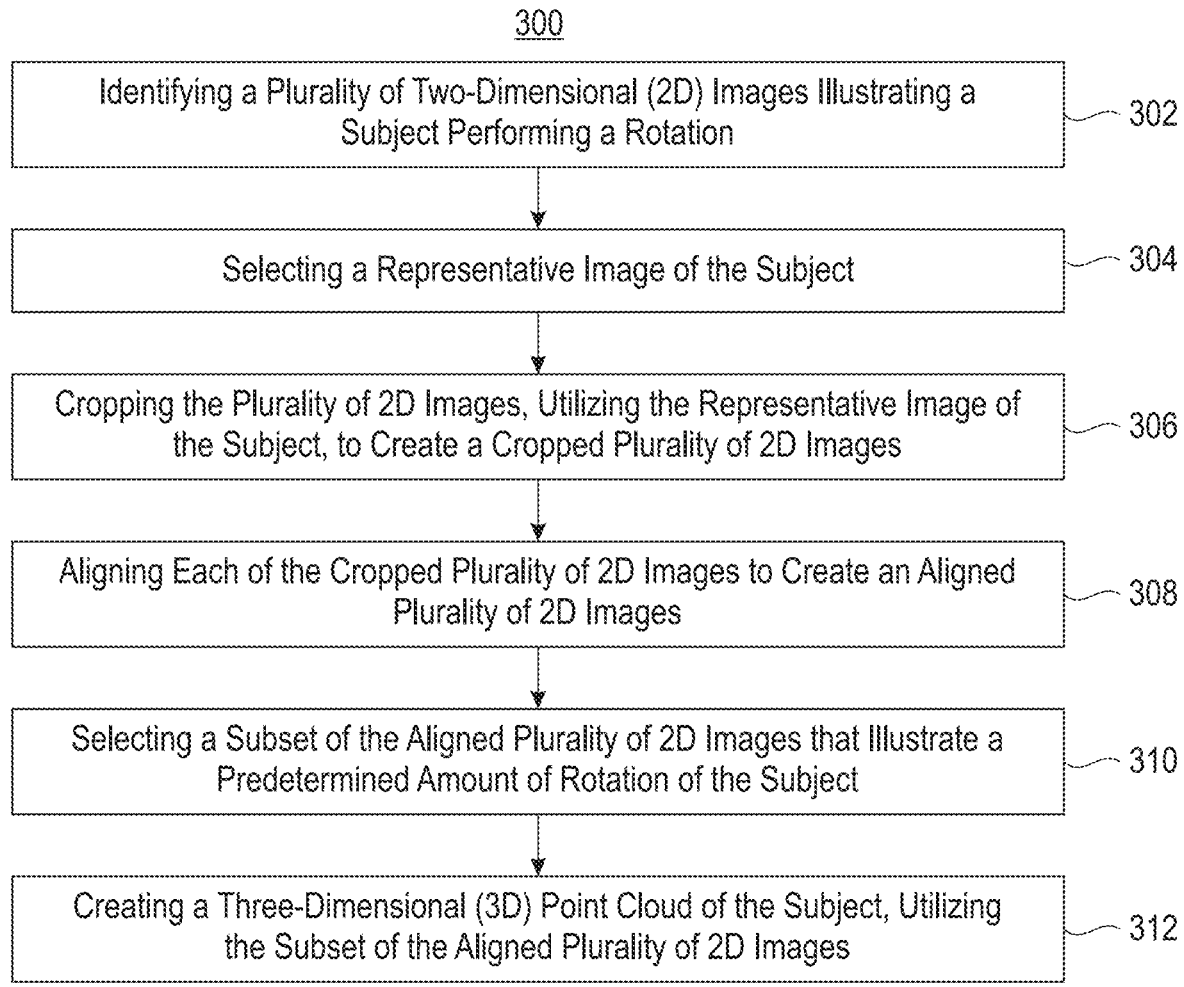
FIG. 3 illustrates a flowchart of a method for creating a three-dimensional model from a sequence of images, in accordance with one embodiment.

Now referring to FIG. 3, a flowchart of a method 300 is shown according to one embodiment. The method 300 may be performed in accordance with the present invention in any of the environments depicted in FIGS. 1-2 and 4, among others, in various embodiments. Of course, greater or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a plurality of two-dimensional (2D) images illustrating a subject performing a rotation are identified. In one embodiment, the plurality of 2D images may include a time sequence of images (e.g., images ordered according to a time of image capture) illustrating the subject rotating at least 180 degrees. In another embodiment, the subject may include any animate or inanimate object for which an image may be taken. For example, the subject may include organisms such as plankton, vehicles such as airplanes, etc.

Additionally, in one embodiment, the subject may be translucent or opaque. In another embodiment, the subject may rotate without assistance. For example, the subject may include an organism such as plankton that rotates naturally while swimming in a liquid. In another example, the subject may include an object such as a spinning dancer, a rolling airplane, etc.

Further, in one embodiment, the subject may rotate with assistance. For example, the subject may rotate involuntarily, utilizing a water vortex (e.g., a microfluid vortex, etc.), an air vortex, a magnetic field, etc. In another embodiment, the plurality of 2D images may be captured using one or more 2D cameras (e.g., digital cameras, infrared cameras, etc.) with a single image sensor. In another embodiment, the plurality of 2D images may be captured using a microscope (e.g., a light microscope such as a monocular microscope, a binocular dissecting scope, a fluorescence microscope, etc.). For example, a microscope may be used to enhance visibility [or "the visibility"] of a rotating subject, and a camera coupled to the microscope may obtain the plurality of 2D images of the rotating subject.

Further still, in one embodiment, the subject may rotate with respect to a fixed/stationary camera. In another embodiment, the subject may rotate around the axis of travel with respect to the stationary camera. In yet another embodiment, the plurality of 2D images may include frames of a 2D video.

Also, in one embodiment, the plurality of 2D images may each include the subject and its environment. In yet another embodiment, the plurality of 2D images may be ordered according to time.

In addition, method 300 may proceed with operation 304, where a representative image of the subject is selected. In one embodiment, the representative image may include a selected portion of one of the plurality of 2D images. For example, the representative image may include a cropped portion of one of the plurality of 2D images that shows only the subject. In another embodiment, the representative image may be selected manually by a user. In yet another embodiment, the representative image may be selected automatically according to one or more predetermined criteria (e.g., size, shape, etc.).

Furthermore, method 300 may proceed with operation 306, where the plurality of 2D images are cropped, utilizing the representative image of the subject, to create a cropped plurality of 2D images. In one embodiment, the representative image of the subject may be used to track the subject within each of the plurality of 2D images. In another embodiment, image analysis may be performed in order to identify the subject within each of the plurality of 2D images. In yet another embodiment, the identified subject may be cropped from each of the plurality of 2D images to obtain only an image of the identified subject and not its environment. In still another embodiment, the cropped plurality of 2D images may constitute a cropped image stack.

Further still, method 300 may proceed with operation 308, where each of the cropped plurality of 2D images is aligned, thereby creating an aligned plurality of 2D images. In one embodiment, aligning the cropped plurality of 2D images may include removing any vertical (e.g., Y-dimensional) or horizontal (e.g., X-dimensional) movement of the subject throughout the cropped plurality of 2D images, in order to create an aligned plurality of images illustrating only the rotational movement of the subject.

Also, in one embodiment, the subject may be centered within each of the aligned plurality of 2D images. In another embodiment, the aligned plurality of 2D images may constitute an aligned image stack.

Additionally, method 300 may proceed with operation 310, where a subset of the aligned plurality of 2D images that illustrate a predetermined amount of rotation of the subject is selected. In one embodiment, the predetermined amount of rotation may include 180 degrees of rotation. In another embodiment, a feature of the subject may be identified. For example, the feature may include a predetermined characteristic of the subject (e.g., an eye, fin, a luminescent bright point, etc.).

Further, in one embodiment, the identified feature of the subject may be marked within the aligned plurality of 2D images. In another embodiment, the identified feature may be tracked over each of the aligned plurality of 2D images to create a 2D projection. For example, the tracking may produce a sinusoidal 2D projection indicating the location of the marker as a function of time.

In another embodiment, an opaque subject may be modeled by making or tagging a fiducial mark on a surface of the subject that is viewable to the camera through 180 degrees of rotation. If the subject is translucent, the fiducial mark may be visible through a greater amount of rotation.

Further still, in one embodiment, a peak marker location and a trough marker location may be identified within the 2D projection. For example, the peak marker location may indicate an image within the aligned plurality of 2D images where the marker is at a top-most portion of the subject. In another example, the trough marker location may indicate an image within the aligned plurality of 2D images where the marker is at a bottom-most portion of the subject.

Also, in one embodiment, images within the aligned plurality of 2D images that are associated with the peak marker location and the trough marker location may be identified. For example, a first image containing the peak marker location and a second image containing the trough marker location may be identified. In another embodiment, the selected subset of the aligned plurality of 2D images may include all images occurring between the images associated with the peak marker location and the trough marker location. For example, the selected subset may include the first image containing the peak marker location the second image containing the trough marker location, and all images between the first image and the second image, ordered according to time.

In this way, the subset of the aligned plurality of 2D images may illustrate the subject, centered within a frame, performing the predetermined amount of rotation. Additionally, in one embodiment, the selected subset of the aligned plurality of 2D images may constitute a rotation image stack.

In addition, method 300 may proceed with operation 312, where a three-dimensional (3D) point cloud of the subject is created, utilizing the subset of the aligned plurality of 2D images. In one embodiment, a plurality of X-slices may be determined for each of the subsets of the aligned plurality of 2D images. For example, an X-slice may represent the sum of all Y-values for a plurality of rotations of the subject at a particular X-value.

Furthermore, in one embodiment, a sinogram may be created by performing a projection sum along the y-axis at each x value across a plurality of rotations. In another embodiment, a Fourier transform is performed on the sinogram. In yet another embodiment, the Fourier transform may be interpolated in Fourier space to obtain a 2D Fourier transform of the subject. In still another embodiment, the interpolation may be inverted to recreate the X-slice image. In yet another embodiment, each X-slice may be examined for the presence of a portion of the subject, and only X-slices containing a portion of the subject may be processed.

Further still, in one embodiment, the above procedure may be repeated for each X-slice of the aligned plurality of 2D images to create a 3D point cloud of the subject. In another embodiment, the 3D point cloud may include a 3D model of the subject. In yet another embodiment, the 3D point cloud may be created locally, remotely (e.g., at a cloud computing environment, etc.), etc. In still another embodiment, a threshold associated with the point cloud may be adjusted in order to observer dimmer or brighter portions of the subject.

For example, a sinogram may include a projection (e.g., summation) of optical density as a function of rotation angle of the subject. To create a sinogram utilizing the subset of the aligned plurality of 2D images, for each X-value of each image all the Y brightness values are integrated (summed). This creates one line of the sinogram for a particular angle, which turns a 2D image into a one-dimensional (1D) projection. This calculation is repeated for every rotation, which corresponds to each frame of the subset of the aligned plurality of 2D images. This builds up a 2D image, composed of 1D projections of optical density (X-axis) as a function of rotation (Y-axis).

Filtered back projection (FBP) may then be applied to the resulting sinogram. In one embodiment, a mathematical foundation of the filtered back projection is the Fourier slice theorem, which uses a Fourier transform of the projection and interpolation in Fourier space to obtain the 2D Fourier transform of the image, which is then inverted to form the reconstructed image.

In this way, a 3D model of a subject may be created from a plurality of 2D images. Additionally, a 3D model may be created for a subject utilizing a stationary camera and a rotating subject. This may allow for the creation of 3D models using inexpensive, readily available fixed-location 2D cameras with a single image sensor.

Figure 4:
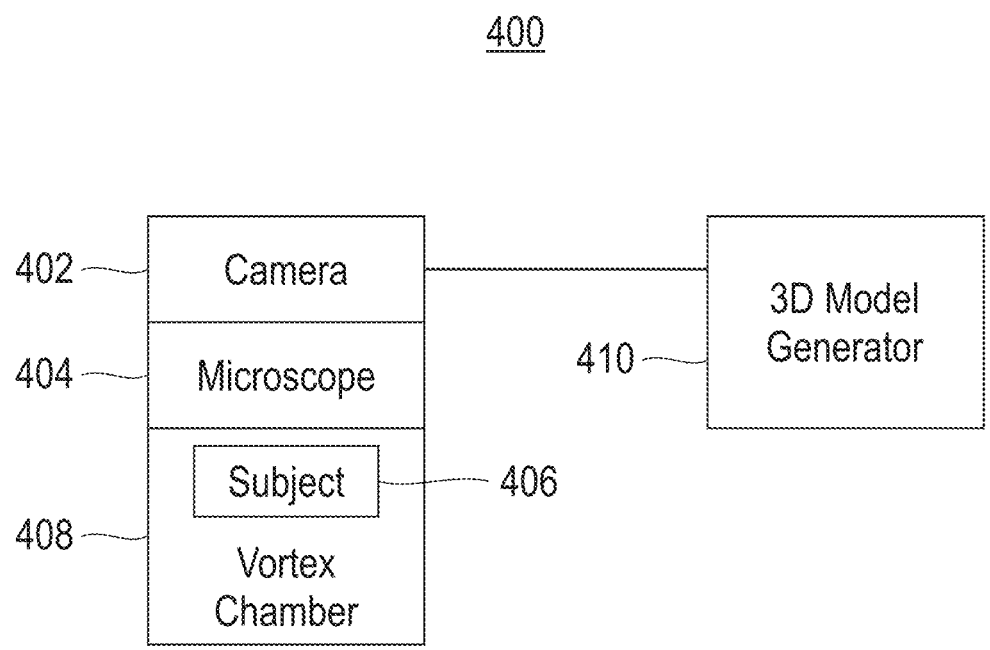
FIG. 4 illustrates an exemplary microscopic subject 3D model generator, in accordance with one embodiment.

FIG. 4 illustrates an exemplary microscopic subject 3D model generator 400, according to one exemplary embodiment. As shown, a camera 402 coupled to a stationary microscope 404 captures a sequence of images of a subject 406 contained on a vortex chamber 408. In one embodiment, the subject 406 may rotate of its own volition while moving within the vortex chamber 408. In another example, the vortex chamber 408 may include a microfluidic vortex chamber that utilizes a water vortex to force the subject 406 to rotate within the vortex chamber 408.

For example, the subject 406 may be injected into a microfluidic chamber so it passes over an image sensor of the camera 402. Clean water may be injected above and below the subject 406 injection port to cause a vortex (e.g., rotation) in the subject stream.

Additionally, in one embodiment, an image of the rotating subject 406 is magnified by the stationary microscope 404 and captured by a single lens and sensor of the camera 402. In another embodiment, the camera 402 may capture and save a plurality of images of the subject 406 during different phases of rotation. In yet another embodiment, this plurality of two-dimensional (2D) images may be sent from the camera 402 to a three-dimensional (3D) model generator 410.

Additionally, although the 3D model generator 410 is shown separate from the camera 402 and stationary microscope 404, in one embodiment, the 3D model generator 410, the camera 402, and/or the stationary microscope 404 may all be located within a single device.

Further, in one embodiment, the 3D model generator 410 may select a representative image of the subject 406 from the plurality of 2D images received from the camera 402. In another embodiment, the 3D model generator 410 may crop each of the plurality of 2D images, utilizing the representative image of the subject 406, to create a cropped plurality of 2D images. In yet another embodiment, the 3D model generator 410 may align each of the cropped plurality of 2D images to create an aligned plurality of 2D images.

Further still, in one embodiment, the 3D model generator 410 may select a subset of the aligned plurality of 2D images that illustrate a predetermined amount of rotation of the subject 406. In another embodiment, the 3D model generator 410 may then create a three-dimensional (3D) point cloud of the subject 406, utilizing the subset of the aligned plurality of 2D images.

In one embodiment, water with plankton may be injected into a microfluidic device (such as the vortex chamber 408) that causes the plankton to rotate at least one half of a rotation as it passed over an imaging sensor of the camera 402. Software at the 3D model generator 410 may receive images from the image sensor of the camera 402 and may perform a tomographic radon transform to build a 3D model of the plankton from the sequence of 2D images.

In this way, the 3D model generator 410 may create a 3D representation of a subject 406, utilizing a stationary microscope 404 and camera 402, and a rotating subject 406.

Generating Three Dimensional Models of Microscopic Subject from a Sequence of Images Stereo microscopes (also known as dissecting microscopes) can have single detector cameras attached to them; however, the detector camera is only capable of producing a 2D image (much like how our eyes see in 3D but standard cameras take 2D photos). Also, stereo microscopes typically use brightfield illumination and therefore cannot image fluorescent dyes (for fluorescent dyes a fluorescence microscope is needed). Fluorescence microscope techniques present challenges for 3D imaging. For example, epifluorescence microscopy is capable of imaging fast moving specimens, but on thick specimens it will result in out-of-focus light that obscures features of the image and makes 3D reconstruction unreliable. Techniques such as confocal microscopy reduce out-of-focus light to create 3D images, but they require expensive microscopes and laser lines, and are limited in their ability to image large specimens. Confocal microscopy is also often too slow to image fast-moving samples such as swimming cells. The techniques disclosed herein allow for 3D imaging of fast moving, thick specimens using inexpensive techniques of brightfield or epifluorescence microscopy.

One exemplary implementation is based on a radon transform that teaches a function can be reconstructed from a set of its projections. For example, the subject may be rotated between a light source (e.g., visible light) and a detector (e.g., a microscope camera). In one embodiment the subject is a microscopic organism (e.g., plankton with a size of ~100 um) rotated by a vortex of water. In another embodiment, the subject may rotate naturally in a process of swimming or other movement (e.g., Stentor and Rotifer plankton, etc.).

In this way, 3D models may be created for live specimens with a conventional mesoscopic microscope with digital camera, capturing at low frame rates (e.g., 30 frames per second) and standard illumination. Conventional fluorescent dye and illumination techniques may be used to highlight the 3D structure of specimen features (e.g., organelles).

Exemplary Implementation

Figure 5:
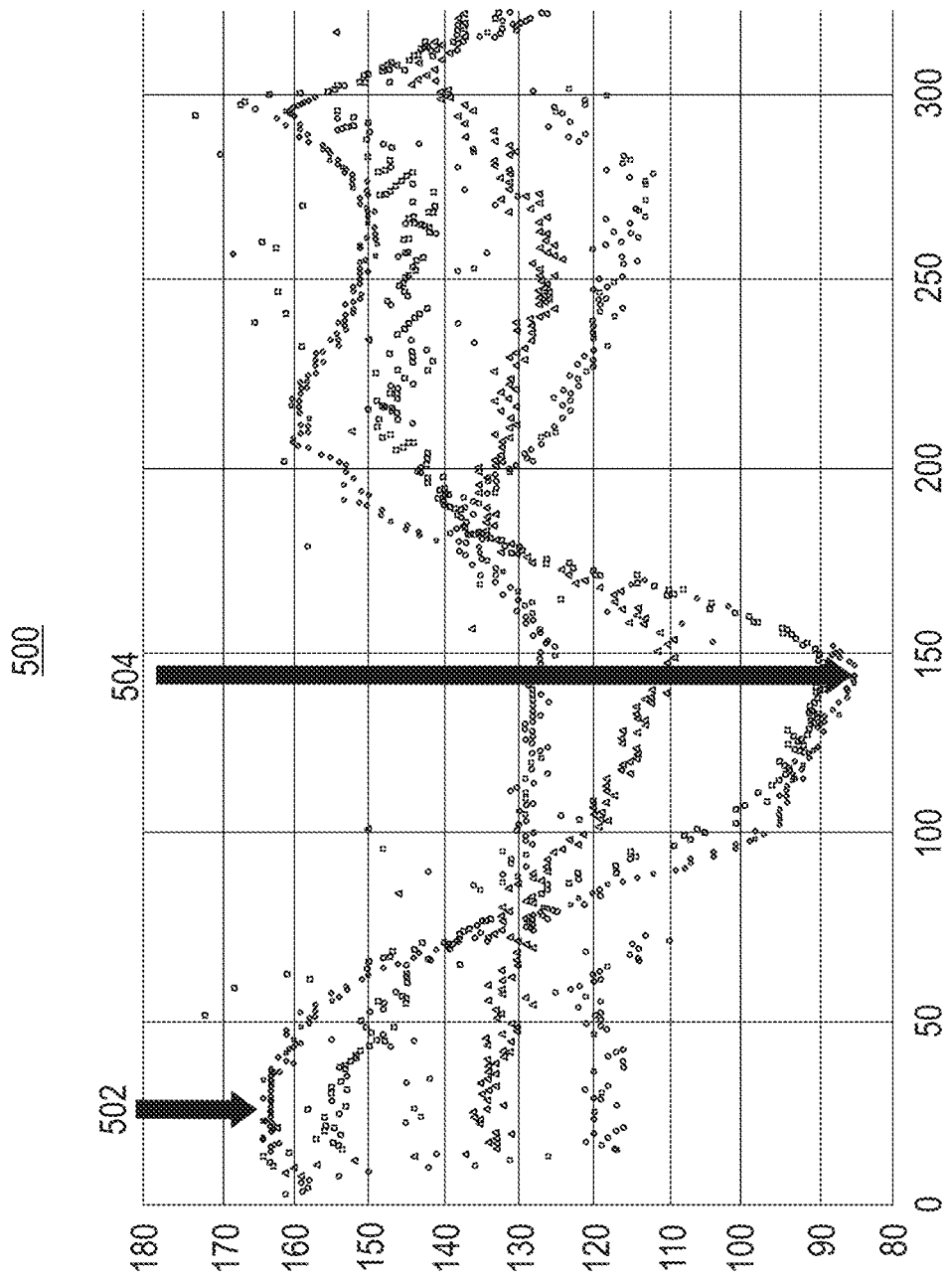
FIG. 5 illustrates an exemplary 2D projection with an associated peak and trough, in accordance with one embodiment.

In one embodiment, a specimen may flow through an imaging chamber which creates a vortex that rotates the specimen at least 180 degrees, while a sequence of 2D images are captured. The resulting sequence of images is processed as follows:

1. Collect 2D microscopic images of the specimen rotating at least 180 degrees along an axis. These images constitute a raw image stack. In one embodiment, the vortex is strong enough to rotate the specimen at least 180 degrees. In another embodiment, image frames may be sequentially captured, e.g., at 30 frames per second and HD quality (e.g., 1920×1080).
2. Select a representative image of the specimen to be modeled. The representative image may be called a template image. In one embodiment, the specimen may be cropped from an image frame to create the template image.
3. Crop the specimen from the raw image stack to create a cropped image stack. In one embodiment, the template image may be matched in each raw image, producing a cropped image that is translationally aligned (according to x and y dimensions).
4. Align all images in the cropped image stack to create an aligned image stack. In one embodiment, undesired pitch and rotations may be corrected, as it is preferred that the specimen only display a roll rotation (e.g., rotation around the axis in which it is moving/flowing). To measure rotational errors, features of the specimen (e.g., bright spots as in blob detection) may be tracked, and a 2D projection of these features may produce a sine wave when only one degree of rotation is exhibited.
5. Select images from the aligned image stack of specimen rotating 180 degrees to create a rotation image stack. In one embodiment, a feature that gives the strongest peak and trough of a sine wave may be selected, and start and stop stack images may be set that correspond to the peak and trough, in order to represent a desired specimen rotation of 180 degrees. FIG. 5 illustrates an exemplary 2D projection 500 with an associated peak 502 and trough 504, indicating the beginning and end of a 180 degree rotation of the specimen, according to one exemplary embodiment.
6. For each X-slice of rotation image stack, construct a radon transform (e.g., a sinogram).
7. Reconstruct each X-slice by performing a filtered back projection (FBP).
   a. Compute a Fourier transform of the sinogram.
   b. Interpolate in Fourier space to obtain the 2D Fourier transform of the image.
   c. Invert to recreate an X-slice image.
8. Repeat Steps 6 and 7 for every X-slice of the aligned image stack. In one embodiment, the Y, Z slice created in steps 6 and 7 for a given X is repeated for all X values of the image, to create a X, Y, Z point cloud stack.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, scripting languages like Python, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a plurality of two-dimensional (2D) images illustrating a subject performing a rotation;
   selecting a representative image of the subject;
   cropping the plurality of 2D images, utilizing the representative image of the subject, to create a cropped plurality of 2D images;
   aligning each of the cropped plurality of 2D images, thereby creating an aligned plurality of 2D images;
   selecting a subset of the aligned plurality of 2D images that illustrate a predetermined amount of rotation of the subject; and
   creating a three-dimensional (3D) point cloud of the subject, utilizing the subset of the aligned plurality of 2D images.

2. The computer-implemented method of claim 1, wherein the plurality of 2D images illustrate the subject rotating at least 180 degrees.

3. The computer-implemented method of claim 1, wherein the plurality of 2D images are captured using a single 2D camera having a single image sensor.

4. The computer-implemented method of claim 1, wherein the plurality of 2D images are captured using a monocular microscope.

5. The computer-implemented method of claim 1, wherein the representative image includes a selected portion of one of the plurality of 2D images.

6. The computer-implemented method of claim 1, wherein the representative image of the subject is used to track the subject within each of the plurality of 2D images.

7. The computer-implemented method of claim 1, wherein cropping the plurality of 2D images includes cropping the subject from each of the plurality of 2D images to obtain only an image of the subject.

8. The computer-implemented method of claim 1, wherein aligning the cropped plurality of 2D images includes removing any vertical or horizontal movement of the subject throughout the cropped plurality of 2D images, thereby creating an aligned plurality of images illustrating only a rotational movement of the subject.

9. The computer-implemented method of claim 1, wherein the predetermined amount of rotation includes 180 degrees of rotation.

10. The computer-implemented method of claim 1, wherein selecting the subset of the aligned plurality of 2D images that illustrate the predetermined amount of rotation of the subject includes:
identifying a feature of the subject,
marking the identified feature of the subject within the aligned plurality of 2D images,
tracking the identified feature over each of the aligned plurality of 2D images to create a 2D projection,
identifying a peak marker location and a trough marker location within the 2D projection,
identifying images within the aligned plurality of 2D images that are associated with the peak marker location and the trough marker location, and
selecting the subset of the aligned plurality of 2D images so that it includes all images occurring between the images associated with the peak marker location and the trough marker location.

11. The computer-implemented method of claim 1, wherein creating the three-dimensional (3D) point cloud of the subject includes, for each of a plurality of X-slices determined for each of the subset of the aligned plurality of 2D images:
calculating a radon transform for the X-slice to create a sinogram,
determining a Fourier transform of the sinogram,
interpolating the Fourier transform in Fourier space to obtain a 2D Fourier transform of the subject, and
inverting the interpolation to recreate an X-slice image.

12. A computer program product for creating a three-dimensional model from a sequence of images, the computer program product comprising a computer readable storage medium having program instructions embodied therewith, wherein the computer readable storage medium is not a transitory signal per se, the program instructions executable by a processor to cause the processor to perform a method comprising:
identifying, by the processor, a plurality of two-dimensional (2D) images illustrating a subject performing a rotation;
selecting, by the processor, a representative image of the subject;
cropping, by the processor, the plurality of 2D images, utilizing the representative image of the subject, to create a cropped plurality of 2D images;
aligning, by the processor, each of the cropped plurality of 2D images, thereby creating an aligned plurality of 2D images;
selecting, by the processor, a subset of the aligned plurality of 2D images that illustrate a predetermined amount of rotation of the subject; and
creating, by the processor, a three-dimensional (3D) point cloud of the subject, utilizing the subset of the aligned plurality of 2D images.

13. The computer program product of claim 12, wherein the plurality of 2D images illustrate the subject rotating at least 180 degrees.

14. The computer program product of claim 12, wherein the plurality of 2D images are captured using a single 2D camera having a single image sensor.

15. The computer program product of claim 12, wherein the plurality of 2D images are captured using a monocular microscope.

16. The computer program product of claim 12, wherein the representative image includes a selected portion of one of the plurality of 2D images.

17. The computer program product of claim 12, wherein the representative image of the subject is used to track the subject within each of the plurality of 2D images.

18. The computer program product of claim 12, wherein cropping the plurality of 2D images includes cropping the subject from each of the plurality of 2D images to obtain only an image of the subject.

19. The computer program product of claim 12, wherein aligning the cropped plurality of 2D images includes removing any vertical or horizontal movement of the subject throughout the cropped plurality of 2D images, thereby creating an aligned plurality of images illustrating only a rotational movement of the subject.

20. A system, comprising:
a processor; and
logic integrated with the processor, executable by the processor, or integrated with and executable by the processor, the logic being configured to:
identify a plurality of two-dimensional (2D) images illustrating a subject performing a rotation;
select a representative image of the subject;
crop the plurality of 2D images, utilizing the representative image of the subject, to create a cropped plurality of 2D images;
align each of the cropped plurality of 2D images, thereby creating an aligned plurality of 2D images;
select a subset of the aligned plurality of 2D images that illustrate a predetermined amount of rotation of the subject; and
create a three-dimensional (3D) point cloud of the subject, utilizing the subset of the aligned plurality of 2D images.

21. A computer-implemented method, comprising:
identifying a plurality of two-dimensional (2D) images illustrating a subject performing a rotation;
selecting a representative image of the subject;
cropping the plurality of 2D images, utilizing the representative image of the subject, to create a cropped plurality of 2D images;
aligning each of the cropped plurality of 2D images, thereby creating an aligned plurality of 2D images;
selecting a subset of the aligned plurality of 2D images that illustrate a predetermined amount of rotation of the subject, including:

identifying a feature of the subject,
marking the identified feature of the subject within the aligned plurality of 2D images,
tracking the identified feature over each of the aligned plurality of 2D images to create a 2D projection,
identifying a peak marker location and a trough marker location within the 2D projection,
identifying images within the aligned plurality of 2D images that are associated with the peak marker location and the trough marker location, and
selecting the subset of the aligned plurality of 2D images so that it includes all images occurring between the images associated with the peak marker location and the trough marker location; and
creating a three-dimensional (3D) point cloud of the subject, utilizing the subset of the aligned plurality of 2D images.

* * * * *